G. HUNTER.
Car-Starter.

No. 164,455. Patented June 15, 1875.

WITNESSES: Chas. Nida, A. F. Terry

INVENTOR: George Hunter
BY ——— ATTORNEYS.

UNITED STATES PATENT OFFICE.

GEORGE HUNTER, OF PAYSON, ILLINOIS.

IMPROVEMENT IN CAR-STARTERS.

Specification forming part of Letters Patent No. 164,455, dated June 15, 1875; application filed May 22, 1875.

*To all whom it may concern:*

Figure 1:
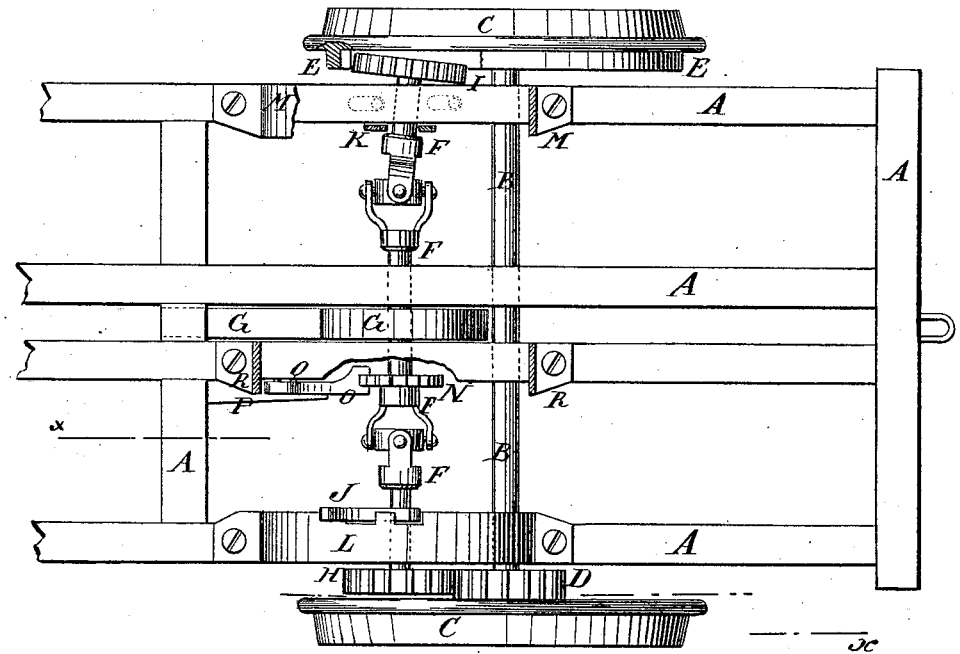
Figure 2:
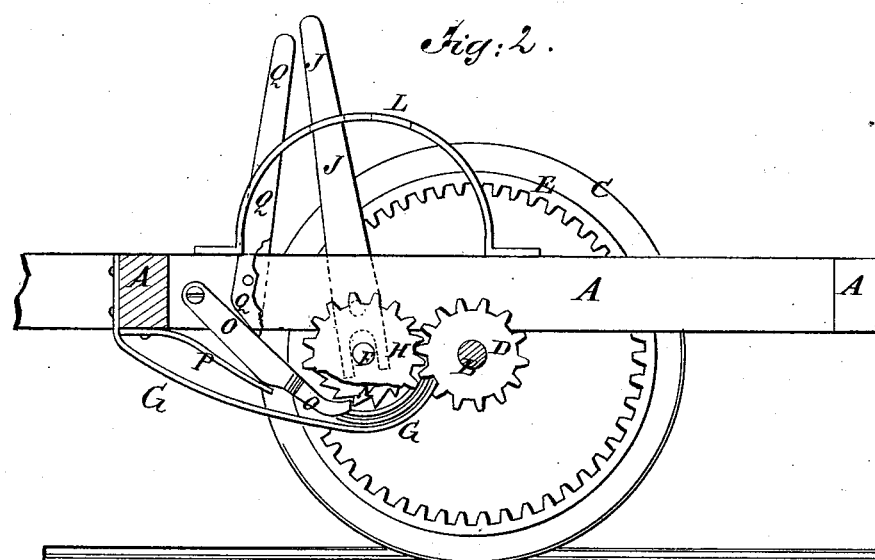

Be it known that I, GEORGE HUNTER, of Payson, in the county of Adams and State of Illinois, have invented a new and useful Improvement in Horse-Car Starters, of which the following is a specification:

Figure 1 is a top view of a portion of a car-frame to which my improvement has been applied, parts being broken away to show the construction. Fig. 2 is a side view of the same, partly in section through the line $x\ x$, Fig. 1.

Similar letters of reference indicate corresponding parts.

The object of this invention is to furnish an improved attachment for street-cars, by means of which the power applied to the car to stop its motion may be stored up, and used to assist in again starting the car in the same direction in which it was going before, which may also be used as an assistant propeller in ascending short grades, and which shall be simple in construction, easily manipulated, and effective in operation.

The invention consists in the combination of the gear-wheels, the jointed shaft, the ratchet-wheel, pawl and spring, and the three levers and their three catch-bars, with each other, and with the frame, the axle, and the wheels of a car, as hereinafter fully described.

A represents the frame of a street-car. B is the axle, and C are the wheels.

To the inner side of the middle part of one of the wheels C is rigidly attached a small gear-wheel, D, and to the inner side of the other wheel C is attached a large internally-toothed gear-wheel, E, the wheel E having three times as many teeth as the wheel D. F is a shaft placed parallel with the axle B, and which is made in three parts, connected with each other by universal joints, as shown in Fig. 1. The middle part of the shaft F revolves in bearings attached to the middle longitudinal bars of the frame A. To the middle part of the shaft F is attached one end of the spring G, which is coiled around the said shaft F, and its other end is attached to the frame A. To the end of one of the end parts of the shaft F is attached a small gear-wheel, H, the teeth of which mesh into the teeth of the small gear-wheel D. To the end of the other end part of the shaft F is attached a small gear-wheel, I, the teeth of which mesh into the teeth of the internally-toothed gear-wheel E. The end parts of the jointed shaft F revolve in sliding bearings attached to the side bars of the frame A, so that the said end parts of the shaft F may be moved laterally to throw the wheels H and I into and out of gear with the wheels D and E. The end parts of the shaft F are moved to throw their wheels into and out of gear by the levers J and K, the forked lower ends of which ride upon the said end parts of the said shaft F. The levers J K are pivoted to the side bars of the frame A, and their upper ends project into such a position that they may be conveniently reached and operated by the driver. The levers J K move along the edges of two bars or plates, L M, in each of which are formed two notches in position to receive and lock the said levers when holding the gear-wheels in gear and out of gear. To the middle part of the shaft F is attached a ratchet-wheel, N, with the teeth of which the pawl O engages. The pawl O is pivoted to the frame A, and is held against the teeth of the ratchet-wheel N by a spring, P, also attached to the frame A. The pawl O is withdrawn from the ratchet-wheel N, when desired, by the lever Q, the lower end of which rests against the said pawl. The lever Q is pivoted to the frame A, and its upper end projects into such a position that it may be conveniently reached and operated by the driver. The lever Q crosses a bar or plate, R, in which are formed two notches in such position as to receive and lock the said lever when the pawl O is in gear and out of gear with the ratchet-wheel N.

By this construction, when the car is to be stopped, the lever J is adjusted to throw the wheel H into gear with the wheel D, so that the forward movement or momentum of the car may wind up the spring G, the pawl O preventing the said spring from unwinding. The wheel H may then be thrown out of gear with the wheel D.

When the car is to be started, the lever K is operated to throw the wheel I into gear with the wheel E, so that when the pawl O is withdrawn from the ratchet-wheel N the power of the spring G may be applied to the wheel C near its rim, and thus, with a great advantage of leverage, assist in starting the car.

In the same way the spring may be coiled by the advance of the car when upon a level or down grade, and held, to be applied to the car when upon a short upward grade, to assist in its propulsion.

Having thus described my invention, I claim as new and desire to secure by Letters Patent—

The combination of the gear-wheels D H and E I, the jointed shaft F, the ratchet-wheel, pawl, and spring N O P, and the three levers J K Q, and the three catch-bars L M R, with each other and with the frame, the axle and the wheels of a car, substantially as herein shown and described.

GEORGE HUNTER.

Witnesses:
G. L. ROBERTSON,
RAYMOND MARTIN.